W. G. WALL.
WINDOW SASH CONSTRUCTION FOR AUTOMOBILES.
APPLICATION FILED APR. 10, 1917.
1,318,624.
Patented Oct. 14, 1919.
2 SHEETS—SHEET 1.
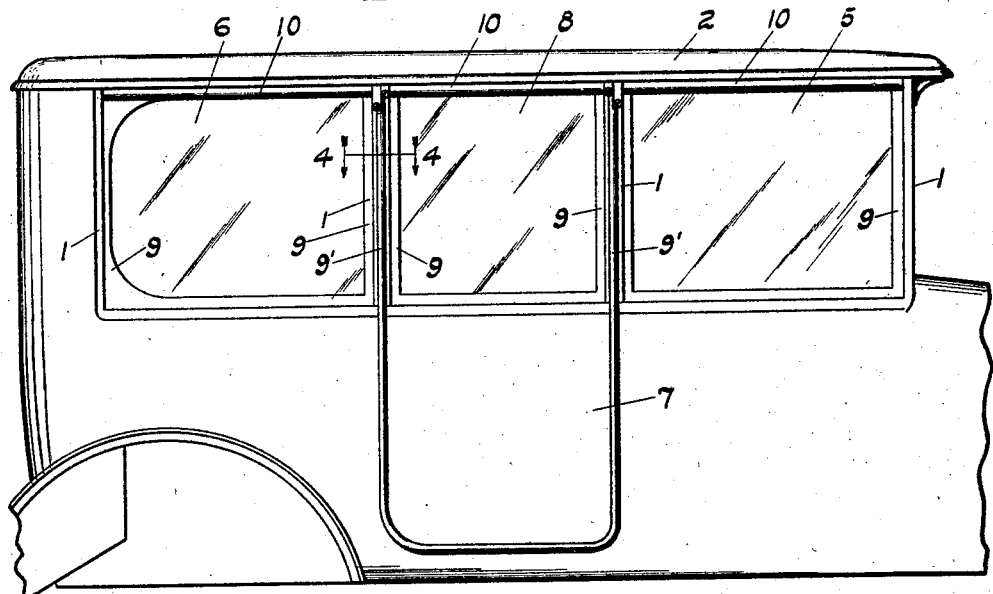
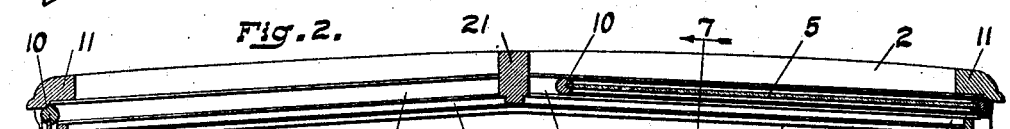
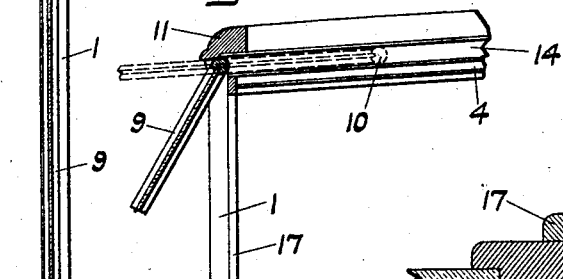
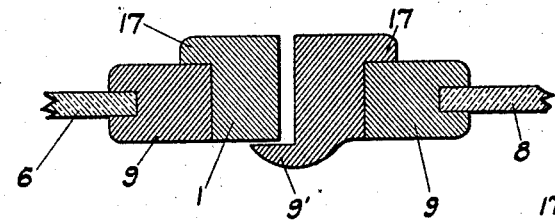
INVENTOR
William Guy Wall
BY
Bradford T Dodish
ATTORNEYS W. G. WALL.
WINDOW SASH CONSTRUCTION FOR AUTOMOBILES.
APPLICATION FILED APR. 10, 1917.
1,318,624.
Patented Oct. 14, 1919.
2 SHEETS—SHEET 2.
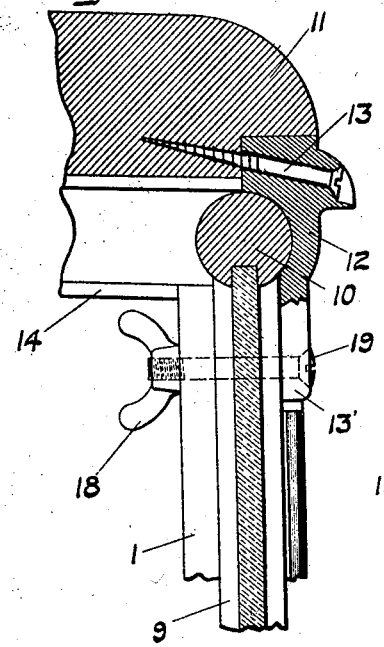
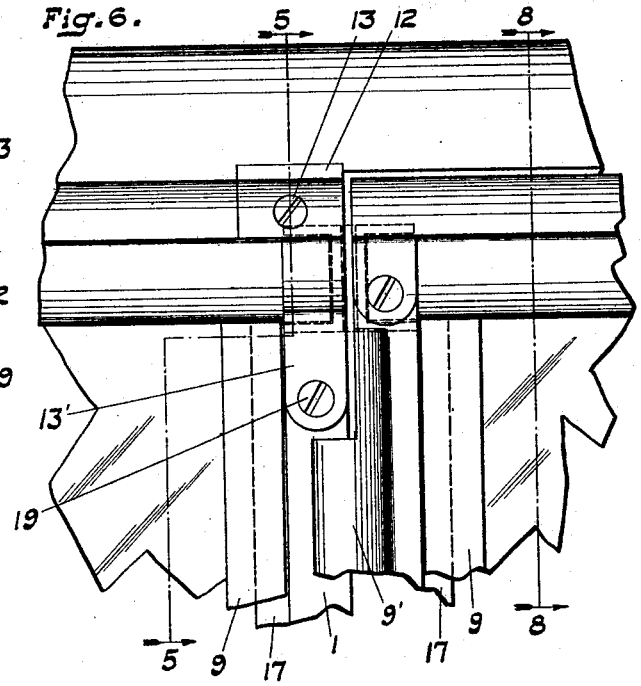
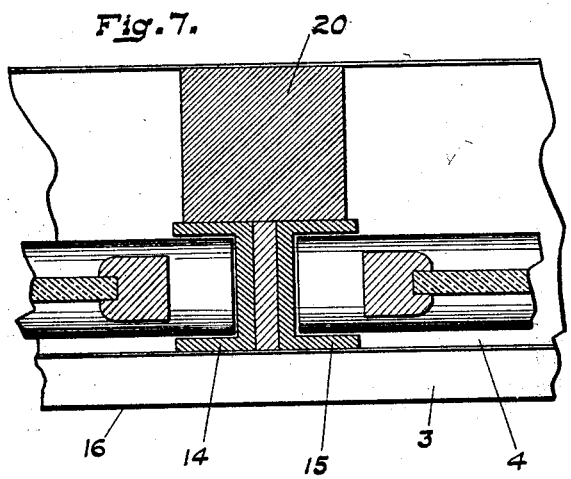
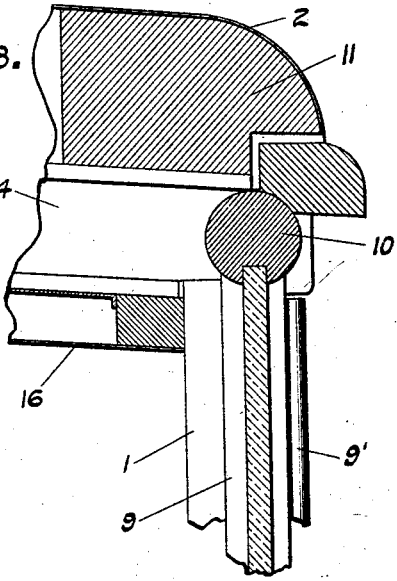
INVENTOR
William Guy Wall
BY
ATTORNEYS

UNITED STATES PATENT OFFICE.

WILLIAM G. WALL, OF INDIANAPOLIS, INDIANA, ASSIGNOR TO NATIONAL MOTOR CAR & VEHICLE CORPORATION, OF INDIANAPOLIS, INDIANA, A CORPORATION OF NEW YORK.

WINDOW-SASH CONSTRUCTION FOR AUTOMOBILES.

1,318,624.  Specification of Letters Patent.  Patented Oct. 14, 1919.

Application filed April 10, 1917. Serial No. 160,985.

*To all whom it may concern:*

Be it known that I, WILLIAM GUY WALL, a citizen of the United States, residing at Indianapolis, Marion county, and State of Indiana, have invented and discovered certain new and useful Improvements in Window-Sash Construction for Automobiles, of which the following is a specification.

My invention relates to sash construction for automobiles and the object is to provide means whereby permanently attached side window sashes of an automobile upper body of rigid and permanent construction may be conveniently moved into and out of closing position and housed when out of closing position in such manner that they will be protected and concealed from view.

With this object and others in view, my invention is embodied in preferable form in the construction and arrangement hereinafter described and illustrated in the accompanying drawings.

In these drawings, Figure 1 is a side view in elevation of part of an automobile showing my invention applied thereto; Fig. 2, a vertical cross section; Fig. 3, an enlarged detail vertical cross section through the corner of the roof and ceiling and showing the sash broken away in depending position in full lines and in dotted lines in partly housed position; Fig. 4, an enlarged detail section through the door and part of the frame for the glass; Fig. 5, a vertical enlarged cross section through the posts and sash rails on line 5—5 of Fig. 6; Fig. 6, an enlarged detail side view at the junction of the door and frame; Fig. 7, a detail central vertical longitudinal section and Fig. 8, an enlarged section on line 8—8 of Fig. 6.

Referring to the drawings, 1 indicates the posts of an upper body structure of rigid permanent form. Carried on the upper ends of these posts is a roof 2, from which is separated by a considerable space adapted to constitute a sash storing chamber, a ceiling structure 3. The chamber formed between the ceiling and roof is indicated by 4. Between posts on one side of the vehicle are mounted swinging window sashes 5 and 6 at the front and rear respectively at each side. The usual hinged door 7 is also provided with a swinging sash 8 which is adapted to move with the door. The posts may be made very narrow and are intended merely to constitute supports for the ceiling and roof and the side rails 9 of the sash swing flush against the posts and do not slide therein as is the arrangement in several forms of permanent bodies now in use. The side rail of the door is provided with a lapping bar 9′ adapted to take over the post. At its upper end each sash is provided with a rail member 10 which is preferably of cylindrical form and is adapted to constitute not only a pivot member on which the sash frame may be turned but also a sliding support whereby the sash may be slid into the chamber 4 and the glass protected from contact with the surfaces above and below the same.

When the sash is in closed position, the pivot bar is adapted to rest upon the upper end of the posts and is held within the chamber by means of a longitudinal side rail 11 fixed to the roof and the bottom edge of which bears against the upper portion of the posts and the upper part of which is held by a bracket 12 secured by screws 13 to the wooden body of the roof. A lower arm 13′ of this bracket extends over the end of the pivot bar 10 and retains the same in place. The roof 2 is spaced from the ceiling 3 to provide the chamber 4 aforesaid by means of channel irons 14 and 15, of which a pair is employed for each sash and which extend transversely of the roof from the outer edge thereof inwardly to the center line of the roof. The ceiling 3 is supported on the ends of the posts and on these channel bars and such ceiling preferably consists of a series of sheet metal panels covered by a suitable lower trimming 16. Each post is provided with a bead 17 adapted to limit the inward swinging movement of the sash when the same is lowered into closing position.

18 indicates a wing nut for the screw 19 passing through the retainer bracket arm 13.

In the use of the device when the windows are in closing position, it will be seen that they depend vertically between the posts and are supported by their circular pivot rails 10 at the junction between the top of the post and the upper side rail joining the roof with such posts. In this position of the sash the side rails thereof bear against the beads on the posts and the lower side rails of the sash may be secured to the body of the car by any suitable form of catches (not herein shown). The adjacent channel bars for one of the end window sashes and for the door are face to face and bear against and may be carried by the transverse beams 20, joined by the longitudinal beam 21.

When it is desired to open the window spaces, the sashes are unfastened and swung upward and outward until they are brought substantially to a horizontal plane whereupon they are pushed inward along the guide members afforded by the channel bars into the chamber between the roof and ceiling, where they are protected from the weather by the roof above the same and the glass of the sash is protected from injury by the rigid ceiling below the same. The sashes on opposite sides of the vehicle are slid in toward the center. When it is desired to close the windows, it is merely necessary to draw them out laterally and swing them down upon their pivots into their proper closing position. It will be seen that the provision of the storage space between the roof and ceiling not only provides a convenient means for storing away the sashes but also serves to effectually protect the same from being broken and also such arrangement does not tend to mar the appearance of the car.

Having thus described my invention, what I claim is:

1. In a vehicle body, in combination with a roof and a ceiling separated from the roof forming a substantially horizontal space, posts supporting said roof and ceiling, swinging side windows on opposite sides of the vehicle between the posts and of less length than the height of the sides, a pivot bar carried at the upper end of each window sash between said ceiling and roof, substantially horizontal channeled guide bars between said roof and ceiling for supporting the sashes, the opposing sashes on opposite sides of the vehicle being adapted to swing into the chamber between the ceiling and roof on substantially the same horizontal plane and each occupying a space terminating short of the central line of the ceiling, a side rail on the roof structure adapted to hold the sash pivot bar within the chamber when the sash is swung down to closing position, and a retaining bracket having an arm extending over the ends of said pivot bar for also retaining the latter.

2. In a vehicle body, a horizontal space formed between the ceiling and roof, horizontal channels in said space, window sashes having pivot bars inserted between said channels so as to allow only horizontal motion of said pivot bars, and means comprising a side rail on the roof, retaining brackets for retaining said pivot bar and preventing any vertical motion of same whereby window sashes may be raised by swinging same on said pivot bars until horizontal and then pushing same into the space between the ceiling and roof.

In witness whereof, I have hereunto set my hand and seal at Indianapolis, Marion county, Indiana, this 27th day of March, A. D. nineteen hundred and seventeen.

WILLIAM G. WALL. [L. S.]

Witnesses:
A. C. RICE,
W. P. DOOLITTLE.